Nov. 12, 1957 L. DIETCH 2,813,225

ADJUSTABLE VOLTAGE SUPPLIES

Filed Feb. 9, 1955

INVENTOR.
LEONARD DIETCH
BY [signature]
ATTORNEY

United States Patent Office 2,813,225

Patented Nov. 12, 1957

2,813,225

ADJUSTABLE VOLTAGE SUPPLIES

Leonard Dietch, Haddonfield, N. J., assignor to Radio Corporation of America, a corporation of Delaware Application February 9, 1955, Serial No. 487,063

10 Claims. (Cl. 315—22)

This invention relates generally to voltage supplies and more particularly to adjustable voltage supplies of a type suitable for use in satisfying the adjustable focus voltage requirements of a cathode ray tube.

Focusing of the beam of a cathode ray tube may be effected electromagnetically or electrostatically. Electrostatic focusing is quite generally practiced in color kinescopes. The focus voltage requirements for a typical tricolor kinescope, such as one of the general type described in the article by H. B. Law entitled "A three-gun shadow-mask kinescope," appearing in the October 1951 issue of the Proceedings of the I. R. E., are significantly more demanding than those of an electrostatically focused monochrome kinescope. To satisfy the focus voltage requirements of a color kinescope with the requisite regulation and without excessive power losses requires improvement over the performance of the usual type of focus voltage supply heretofore used for monochrome kinescopes of the electrostatic focus type. It is a conventional practice to develop a focus voltage for an electrostatically focused kinescope via rectification of the high amplitude transient voltage pulses appearing in the kinescope's associated horizontal deflection wave output transformer during retrace periods of the line scanning cycle, when cutoff of the horizontal output tube causes a sudden collapse of the magnetic field of the horizontal deflection yoke. The usual focus voltage supply of this type simply involves tapping the horizontal output transformer at a point of suitable flyback pulse potential, connecting a diode and a capacitor between the tap and a point of reference potential, shunting a bleeder resistance across the D.-C. output of the rectifying diode, and adjustably tapping the bleeder resistance to derive the variable focus voltage.

In accordance with the present invention a novel and improved adjustable voltage supply is provided, which may satisfactorily serve as the variable focus supply for a color kinescope, and which in relation to the conventional focus supply described above achieves comparable regulation with significantly lowered power consumption and with an appreciable reduction in component cost. In accordance with an embodiment of the invention, such results are achieved by connecting a potentiometer between points on the horizontal output transformer of pulse potential corresponding to the required focus potential range limits, connecting the focus rectifier anode to the adjustable potentiometer tap, and connecting the kinescope focus anode directly to the focus rectifier cathode. A focus supply of this novel type requires less costly resistance elements than the usual focus supply, involves a saving of at least one capacitor, and in a practical example may result in a saving in power consumption of the order of 1:6 relative to the power consumption of a conventional focus supply. Further savings in power dissipation may also be realized in accordance with another embodiment of the present invention by providing a direct connection between the center-tap of the focus voltage adjusting potentiometer and a point on the transformer of similar pulse potential.

Thus, it is a primary object of the present invention to provide a novel and improved adjustable voltage supply.

It is an additional object of the present invention to provide a color television receiver with an improved, low cost, low power adjustable focus supply.

It is also an object of the present invention to provide an improved color kinescope focus voltage supply wherein the requisite regulation is achieved with minimized power losses.

Other objects and advantages of the present invention will be recognized by those skilled in the art after a reading of the following detailed description and an inspection of the accompanying drawings in which.

Figures 1, 2, 3:
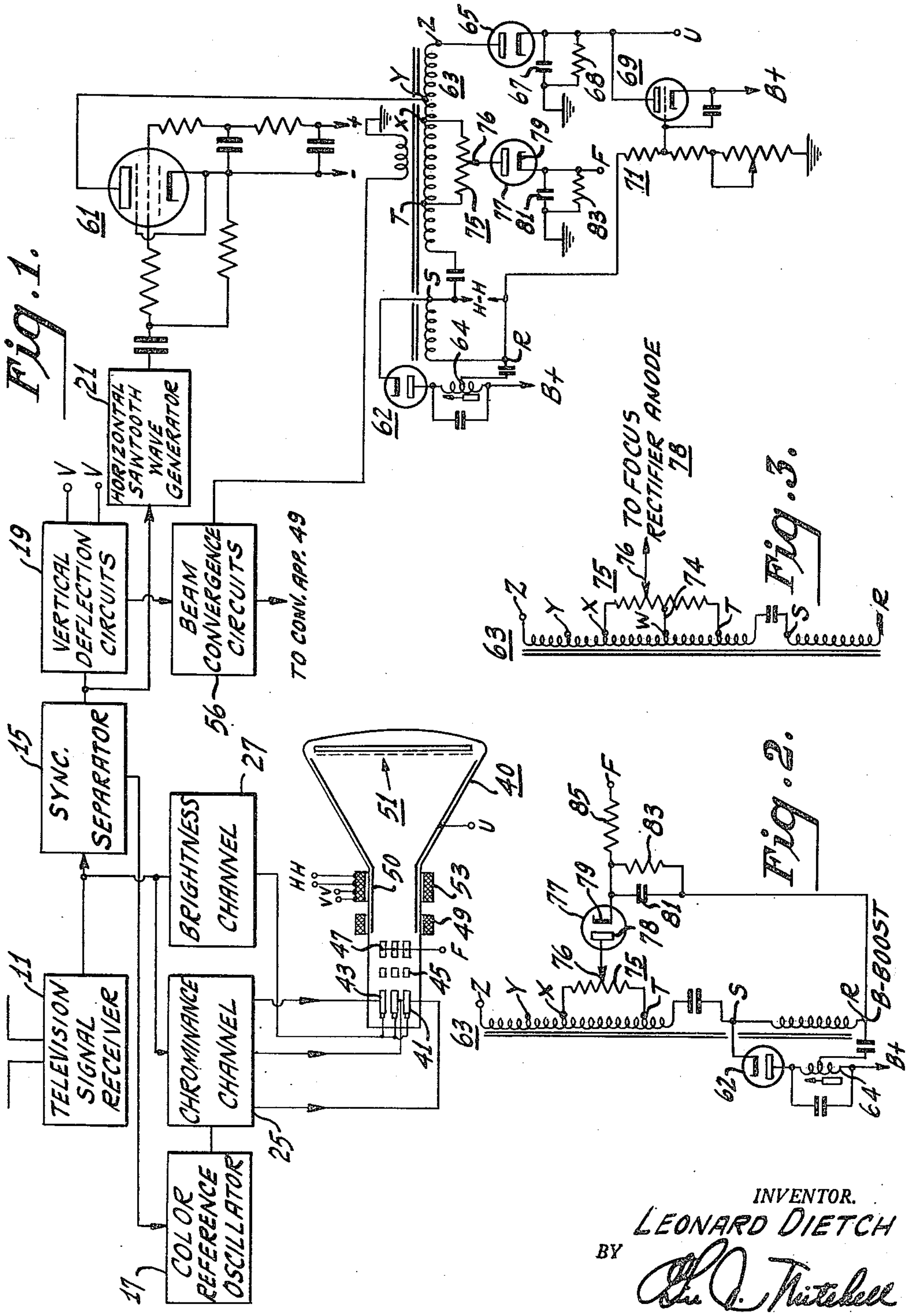
Figure 1 illustrates in block and schematic form a color television receiver utilizing an adjustable voltage supply in accordance with an embodiment of the present invention to supply operating potential to the focus electrode of the receiver's kinescope.
Figures 2 and 3 illustrate schematically modifications of the focus supply shown in Figure 1 in accordance with additional embodiments of the present invention.

In Figure 1, a color television receiver is illustrated essentially in block form, which is generally representative of presently contemplated color receivers for use with signals in accordance with the revised FCC color broadcast standards. Carrier waves modulated by a composite color picture signal are received and video signals recovered therefrom by conventional television signal receiving apparatus 11, which may include the usual R. F. tuner, converting apparatus, I. F. amplifier, signal detector, etc. Synchronizing information is derived from the recovered signals in the sync separator 15 and utilized to synchronously control the receiver's color-reference oscillator 17, to control the generation of vertical scanning waves in the vertical deflection circuits 19, and control the generation of horizontal frequency sawtooth voltage waves in the horizontal sawtooth wave generator 21.

Respective color mixture signals (e. g. $R-Y$, $B-Y$ and $G-Y$ color difference signals) are recovered from the video signal output of apparatus 11 in the chrominance channel 25, which utilizes the output of the color-reference oscillator 17 in synchronous detection of the color subcarrier components of the received signals. The receiver is also provided with a brightness channel 27, having the desired wide band response, through which the broad band monochrome portion of the composite picture signal may pass. The outputs of the brightness channel and the chrominance channel are applied to appropriate beam control elements of the color image reproducer 40.

The color image reproducer 40 is illustrated schematically as one of the three-gun, shadow-mask kinescope type. Color image reproducers of this general type are discussed in some detail in the aforementioned article by H. B. Law. In a color image reproducer of this type, three electron beams are used, one for each primary color. The beams strike a phosphor screen composed of a regular array of red-, green-, and blue-emitting phosphor dots. Between the electron gun position and the phosphor screen there is placed a thin perforated metal sheet for the purpose of partially masking the electron beams. The phosphor dot array on the screen comprises a plurality of closely spaced phosphor dot trios, each trio consisting of a red-, green-, and blue-emitting phosphor dot with the centers of the dots lying at the corners of an equilateral triangle. The trios themselves lie at the corners of an equilateral triangle of larger size. Associated with each of the phosphor dot trios is a hole in the video mask, these holes also being located at the corners of an equilateral triangle. The three beams, disposed 120° apart about the tube axis, are converged to a point on the mask by suitable static and dynamic beam converging means. The electron beam which is to contribute the red portion of the picture is prevented, by the mask, from striking those areas on the screen containing blue and green emitting phosphors. Likewise the green and blue beams can strike only the green and blue emitting phosphor dots, respectively. The target structure 51 of the illustrative color kinescope 40 may be considered to be of the general shadow-mask type above described.

As schematically illustrated, the three electron beams are developed and shaped in respective electron gun structures, each including a thermionic cathode 41, a control grid 43, a first anode or accelerating electrode 45, and a focusing electrode 47. The electron gun structures may be disposed symmetrically about the tube axis such as to produce three substantially parallel beams, or may be inclined at respective angles to the tube axis so as to provide three beams substantially converging at a common point on the target.

Electromagnetic beam convergence apparatus 49, energized by suitable dynamic convergence waveforms generated in the beam convergence circuits 56 along with an appropriate (static convergence) D.-C. component, serves to converge the three beams to a common point in the plane of the shadow mask of target structure 51 throughout the scanning of the raster. The principles of multibeam convergence, and a description of typical circuits for developing dynamic convergence waveforms from sawtooth waves of field and line frequency may be found in an article by Albert W. Friend appearing in the October 1951 issue of the Proceedings of the I. R. E. and entitled "Deflection and convergence in color kinescopes." As illustrated, the beam convergence circuits may derive the respective sawtooth information from the vertical deflection circuits 19 and the horizontal output transformer 63, and convert these sawtooth waves into essentially parabolic waveforms, as disclosed in the aforementioned Friend article, for combined application with a D.-C. component as suitable convergence waveforms to the convergence apparatus 49.

To effect deflection of the three beams to trace a scanning raster on the target structure 51, a deflection yoke 53 is provided with appropriately disposed horizontal and vertical deflection windings. The yoke 53 is illustrated as having vertical yoke terminals V—V, to which field frequency scanning waves developed in the vertical deflection circuits 19 are applied, and horizontal yoke terminals H—H, deriving line frequency scanning waves from the horizontal output tube 61 via the horizontal output transformer. The illustrated horizontal output transformer 63 is of the autotransformer type, the output of the horizontal output tube 61 being applied across a selected portion of the total series of windings, and the horizontal yoke being effectively coupled across a smaller segment of this portion. The driving connection of output tube 61 to the transformer 63 is illustrated as being at an intermediate point "Y," while the yoke connections are illustrated at lower potential terminals "R" and "S" on the transformer 63. The conventional damper tube 62 is illustrated as having its cathode connected to transformer 63 at intermediate point "S," and its anode connected via a horizontal tuning control inductance 64 to a suitable B+ supply (not illustrated), the center-tap of inductance 64 being connected via a B-boost capacitor to the low potential terminal "R" on the transformer 63. Details of components and circuitry conventionally associated with yoke circuits, such as width controls, centering circuits, etc. have not been illustrated for the sake of simplifying the drawing.

The receiver's high voltage supply includes a rectifying diode 65, having its anode connected to the high potential terminal "Z" of the horizontal deflection wave output transformer 63 and its cathode connected via capacitor 67 and bleeder 68 in parallel to ground. The supply output terminal "U," to which the kinescope's ultor electrode 50 is connected, is supplied the high D.-C. potential required for the ultor electrode by means of its connection to the cathode of diode 65. The requisite stability of the supplied ultor voltage is insured by the presence of a shunt regulator tube 69, having its anode connected to the terminal "U," its cathode returned to ground via a B+ supply, and its control grid deriving an error or reference potential from a suitable tapping point on a bleeder 71 connected between terminal "R" (a point of B-boost potential) and ground.

The novel focus voltage supply embodying the principles of the present invention is incorporated in the illustrated receiver as follows. The fixed terminals of a potentiometer 75 are connected to respective intermediate points "T" and "X" on the horizontal output transformer 63. The adjustable tap 76 on potentiometer 75 is connected to the input electrode of the focus rectifier, i. e. to the anode 78 of a diode 77. The cathode 79 of diode 77 is directly connected to the supply output terminal "F," to which the focusing electrodes 47 of the kinescope electron gun structures are coupled. The capacitor 81 is connected between the diode cathode 79 and a point of reference potential (i. e. ground in the illustrative embodiment), a resistance 83 being shunted across the capacitor 81.

Control of the D.-C. focusing voltage appearing at terminal "F" to be supplied to the focusing electrodes 47 is effected by adjustment of the potentiometer tap 76 to selectively control the amplitude of the flyback pulses supplied to rectifying diode 77. This contrasts with the conventional focus supply, in which the amplitude of the flyback pulses supplied to the focus rectifier remains fixed and adjusting potentiometer is connected in the rectifier output circuit to select a desired portion of the rectifier's D.-C. output. It will be observed that the focus voltage adjusting potentiometer 75 need only be subject to a periodic pulse potential difference across it corresponding to the width of the desired focus adjustment range. Thus, a low cost potentiometer, such as one of the ordinary one-watt carbon type, for example, may serve as the focus potentiometer 75 of the novel supply, in contrast with the relatively costly, high voltage type required in the conventional supply. The focus bleeder resistance 83 required in the novel supply may be a low cost, low power resistor (with wide tolerance), whereas the focus bleeder resistance required in the conventional supply is normally a relatively costly resistor of high power rating, with tight tolerance requisite. In the conventional focus supply, a focus input filter capacitor is required between the focus rectifier output electrode and a reference potential point, as well as a bypass filter capacitor connected between the potentiometer tap from which the output voltage is derived and the reference potential point, whereas in the novel focus supply described above a single capacitor 81 suffices, effectively serving both purposes.

In a practical example of the focus supply circuit shown in Figure 1, which has proved quite satisfactory in operation, the circuit components having the following values: potentiometer 75—240K, capacitor 81—.01 $\mu$f., bleeder 83—50 megohms, the rectifier 77 being of an experimental 1X2B type, and the focus voltage range over which adjustment may be effected being from 3750 volts to 5250 volts. With the above-indicated circuit component values, the novel supply possesses a maximum source impedance of approximately 1 megohm, suitable for satisfactory regulation of the delivered focus voltage, with a total power dissipation of approximately 1 watt. It may be noted that selection of circuit component values for the conventional type of focus supply to obtain comparable regulation (i. e. to obtain a maximum source impedance of 1 megohm) would result in a focus supply having a total power dissipation of approximately 6 watts. It may thus be appreciated that the simplified supply embodying the principles of the present invention, wherein the focus voltage adjusting potentiometer controls the input pulse amplitude in the focus rectifier input circuit, permits development of a well-regulated adjustable focus voltage with a saving in component cost and a saving in power dissipation relative to the usual focus supply, wherein the focus voltage adjusting potentiometer directly controls the D.-C. output of the supply in the focus rectifier output circuit.

In Figure 2, a modification of the focus supply of Figure 1 in accordance with another embodiment of the present invention is illustrated schematically. It will be noted that the modification comprises (in addition to the inclusion of a current limiting resistor 85 in the connection of the rectifier cathode 79 to the focus supply output terminal "F") return of the filter capacitor 81 and the bleeder resistance 83 to a point of B-boost potential, e. g. the low potential terminal "R" of transformer 63. It may be appreciated that with respect to the development of the focus voltage the terminal "R" is effectively a point of reference potential. However, the advantage of returning the filter capacitor 81 and bleeder resistance 83 thereto rather than to a point of zero D.-C. potential is that a reduction in the voltage rating of the capacitor 81 is thereby permitted. An accompanying reduction in the resistance value of bleeder 83 is likewise permissible with such return to a B-boost potential point. As a practical example of component values for the circuit arrangement of Figure 2, the bleeder 83 may have a value of 30 megohms, and capacitor 81 may safely be a 1000 $\mu\mu$f. capacitor with a 5 kv. voltage rating. It may be noted at this point that while a smaller capacitance value than 1000 $\mu\mu$f. would be sufficient for the filtering required of capacitor 81, use of a capacitance value of the indicated magnitude is desirable as a protection against arcing between the ultor electrode and focus electrode in the kinescope 40.

A further modification of the circuit arrangements of Figures 1 or 2 is indicated by the schematic illustration of a portion of the focus supply in Figure 3. It will be noted that in the modified supply of Figure 3 the focus voltage adjusting potentiometer 75 is provided with a center-tap which is directly connected by a lead 74 to a point "W" on the horizontal output transformer 63 intermediate the terminals "T" and "X," the point "W" being a point on the transformer having substantially the same flyback pulse potential as the potentiometer center-tap. A significant advantage of providing this center-tap connection to the transformer 63 is that, for a given maximum source impedance, a doubling of the resistance value of potentiometer 75 relative to that required where the center-tap connection is not made may be effected with a consequent substantial reduction of power dissipation; or, conversely, for a given resistance value of potentiometer 75 and thus a given amount of power dissipation, a halving of the maximum source impedance may be realized. It will of course be appreciated that advantages of a similar character may also be provided by connecting intermediate points on the potentiometer 75 other than the center-tap to respective intermediate points on the transformer 63 of corresponding flyback pulse potential.

Having thus described the invention, what is claimed is:

1. In a color television receiver including a color kinescope and a deflection wave transformer subject to the periodic appearance of flyback pulses, said receiver also including a source of B-boost potential, an adjustable focus voltage supply for developing a focus voltage for said color kinescope comprising in combination a potentiometer having a pair of fixed terminals and an adjustable tap, means for coupling said potentiometer fixed terminals to respective intermediate points on said transformer of differing flyback pulse potential, a rectifier having an input electrode and an output electrode, means for coupling said rectifier input electrode to the adjustable tap on said potentiometer, a capacitor coupling said rectifier output electrode to said source of B-boost potential, and means for deriving said focus voltage from said rectifier output electrode.

2. In a color television receiver including a color kinescope and a deflection wave transformer subject to the periodic appearance of flyback pulses, an adjustable focus voltage supply for developing a focus voltage for said color kinescope comprising in combination a potentiometer having a pair of fixed terminals and an adjustable tap, said potentiometer also being provided with a fixed center-tap, means for coupling said potentiometer fixed terminals to respective intermediate points on said transformer of differing flyback pulse potential, means for connecting said potentiometer center-tap to a point on said transformer of a flyback pulse potential intermediate the flyback pulse potentials of said intermediate points, a rectifier having an input electrode and an output electrode, means for coupling said rectifier input electrode to the adjustable tap on said potentiometer, and means for deriving said focus voltage from said rectifier output electrode.

3. In a color television receiver including a color kinescope and a deflection wave transformer subject to the periodic appearance of flyback pulses, an adjustable focus voltage supply for developing a focus voltage for said color kinescope comprising in combination a potentiometer having a pair of fixed terminals and an adjustable tap, means for coupling said potentiometer fixed terminals to respective intermediate points on said transformer of differing flyback pulse potential, means for providing a direct connection between an intermediate point on said potentiometer and a point on said transformer of corresponding flyback pulse potential, a rectifier having an input electrode and an output electrode, means for coupling said rectifier input electrode to the adjustable tap on said potentiometer, and means for deriving said focus voltage from said rectifier output electrode.

4. In a color television receiver including a color kinescope and a deflection wave transformer subject to the periodic appearance of flyback pulses, said transformer having a plurality of output terminals of differing flyback pulse potential, a power supply for developing a focus voltage for said color kinescope adjustable in a predetermined range comprising the combination of a potentiometer having a pair of fixed input terminals and an adjustable output terminal, means for connecting said potentiometer input terminals to respective ones of said transformer output terminals of respective flyback pulse potentials which substantially correspond to the limits of the desired range of adjustment of said focus voltage, a rectifier having an input electrode and an output electrode, means for connecting said rectifier input electrode to said adjustable potentiometer output terminal, a capacitor coupling said rectifier output electrode to a point of reference potential, and a resistor shunting said capacitor, said adjustable focus voltage being derived from said rectifier output electrode.

5. In a color television receiver including a color kinescope comprising a beam focusing electrode and a deflection wave transformer subject to the periodic appearance of flyback pulses, said transformer having a plurality of output terminals at which said flyback pulses appear with respectively different amplitudes of pulse potential, a power supply for developing an operating potential for said color kinescope focusing electrode adjustable in a predetermined range comprising the combination of a potentiometer having a pair of fixed input terminals and an adjustable output terminal, means for connecting said potentiometer input terminals to respective ones of said transformer output terminals of intermediate flyback pulse potential amplitude substantially corresponding to the limits of the desired range of adjustment of said focus voltage, a diode having an anode and a cathode, means for connecting said diode anode to said adjustable potentiometer output terminal, a capacitor coupling said diode cathode to a point of reference potential, a resistor shunting said capacitor, and means for connecting said diode cathode to said color kinescope focusing electrode.

6. In a color television receiver including a color kinescope comprising a focusing electrode and including a deflection wave transformer subject to the periodic appearance of flyback pulses, said transformer having a plurality of output terminals at which said flyback pulses appear with respectively different amplitudes of pulse potential, said receiver including a terminal at which a boosted B+ potential is provided, a power supply for developing an adjustable operating potential for said color kinescope focusing electrode comprising the combination of a potentiometer having a pair of fixed input terminals and an adjustable output terminal, means for connecting said potentiometer input terminals to respective ones of said transformer output terminals of intermediate flyback pulse potential amplitude, a rectifier having an input electrode and an output electrode, means for connecting said rectifier input electrode to said adjustable potentiometer output terminal, a capacitor coupling said rectifier output electrode to said boosted B+ terminal, and a resistor shunting said capacitor, said focusing electrode operating potential being derived from said rectifier output electrode.

7. In a color television receiver including a color kinescope comprising a beam focusing electrode and a deflection wave transformer subject to the periodic appearance of flyback pulses, said transformer having a plurality of output terminals at which said flyback pulses appear with respectively different amplitudes of pulse potential, a power supply for developing an operating potential for said color kinescope focusing electrode, said operating potential being adjustable in a predetermined range, comprising the combination of a center-tapped resistance, means for connecting one end of said center-tapped resistance to one of said transformer output terminals having a flyback pulse potential substantially corresponding to the upper limit of the desired range of adjustment of said focus voltage, means for connecting the opposite end of said center-tapped resistance to another one of said transformer output terminals having a flyback pulse potential substantially corresponding to the lower limit of the desired range of adjustment of said focus voltage, means for connecting the center-tap of said resistance to a third one of said transformer output terminals having a flyback pulse potential intermediate the respective flyback pulse potentials of said first-named and second-named transformer output terminals, a rectifier having an input electrode and an output electrode, means for adjustably connecting said rectifier input electrode to said resistance, and means for deriving said focusing electrode operating potential from said rectifier output electrode.

8. A power supply in accordance with claim 7 including a capacitor coupling said rectifier output electrode to a point of reference potential, a bleeder resistance, and means for connecting said bleeder resistance across said capacitor.

9. A power supply in accordance with claim 7 wherein said receiver is provided with a B-boost terminal, and wherein said power supply includes a capacitor coupled between said rectifier output electrode and said B-boost terminal.

10. In a color television receiver including a color kinescope and a deflection wave transformer subject to the periodic appearance of flyback pulses, said transformer having a plurality of output terminals of differing flyback pulse potential, a power supply for developing a focus voltage for said color kinescope adjustable in a predetermined range comprising the combination of a potentiometer having a pair of fixed input terminals and an adjustable output terminal, means for connecting said potentiometer input terminals to respective ones of said transformer output terminals of respective flyback pulse potentials which substantially correspond to the limits of the desired range of adjustment of said focus voltage, a rectifier having an input electrode and an output electrode, means for connecting said rectifier input electrode to said adjustable potentiometer output terminal, and a capacitor coupling said rectifier output electrode to a point of reference potential, said adjustable focus voltage being derived from said rectifier output electrode.

References Cited in the file of this patent

UNITED STATES PATENTS

| | | |
|---|---|---|
| 2,628,326 | Bridges | Feb. 10, 1953 |
| 2,713,649 | Parker | July 19, 1955 |